(12) United States Patent
Sasaki et al.

(10) Patent No.: US 9,032,233 B2
(45) Date of Patent: May 12, 2015

(54) ON-BOARD NETWORK SYSTEM

(71) Applicant: Denso Corporation, Kariya (JP)

(72) Inventors: Takahiro Sasaki, Kasugai (JP); Tomohisa Kishigami, Obu (JP); Tomoko Kodama, Kariya (JP)

(73) Assignee: Denso Corporation, Kariya (JP)

( * ) Notice: Subject to any disclaimer, the term of this patent is extended or adjusted under 35 U.S.C. 154(b) by 65 days.

(21) Appl. No.: 13/960,034

(22) Filed: Aug. 6, 2013

(65) Prior Publication Data

US 2014/0047255 A1 Feb. 13, 2014

(30) Foreign Application Priority Data

Aug. 10, 2012 (JP) ................. 2012-178171

(51) Int. Cl.
*G06F 1/32* (2006.01)
*H04L 12/40* (2006.01)

(52) U.S. Cl.
CPC .............. *G06F 1/3234* (2013.01); *H04L 12/40* (2013.01); *H04L 12/40039* (2013.01); *H04L 2012/40273* (2013.01)

(58) Field of Classification Search
CPC .. G06F 1/3234; H04L 12/40039; H04L 12/40
USPC .................. 713/320, 323; 709/224; 710/105; 714/25, 48
See application file for complete search history.

(56) References Cited

U.S. PATENT DOCUMENTS

| | | | | |
|---|---|---|---|---|
| 6,519,720 | B1 * | 2/2003 | Mores | 714/43 |
| 7,389,469 | B2 * | 6/2008 | Kim | 714/785 |
| 7,636,861 | B2 * | 12/2009 | Leech et al. | 713/310 |
| 8,140,878 | B2 * | 3/2012 | Leech et al. | 713/323 |
| 8,768,163 | B2 * | 7/2014 | Kim et al. | 398/9 |

FOREIGN PATENT DOCUMENTS

| | | |
|---|---|---|
| JP | 2011-087112 | 4/2011 |
| JP | 2011-218882 | 11/2011 |

* cited by examiner

*Primary Examiner* — Stefan Stoynov
(74) *Attorney, Agent, or Firm* — Harness, Dickey & Pierce, PLC

(57) ABSTRACT

An on-board network system is presented. The on-board network system sends a sleep-entered message to a communication bus. The sleep-entered message is sent under a condition that a sleep condition is satisfied on a basis that a network management (NM) message is ceased during state transition process in which node's state transfers from a normal state to a power-saving state. A monitoring ECU corresponding to a master performs an abnormality detection process. In the abnormality detection process, the monitoring ECU detects an abnormality state of the state transition process based on whether or not the sleep-entered message is sent from any one of nodes, thereby it is possible to detect the abnormality state not only during each node is a normal state but also during a bus-sleep state.

21 Claims, 11 Drawing Sheets

FIG.4A

| INDEX | NODE ID |
|---|---|
| 0 | 1 |
| 1 | 3 |
| 2 | 5 |
| 3 | 10 |
| 4 | 12 |

| INDEX | RECEPTION OF SLEEP-ENTERED MESSAGE |
|---|---|
| 0 | 1 |
| 1 | 0 |
| 2 | 0 |
| 3 | 1 |
| 4 | 1 |

32

1 : RECEIVED, 0 : NOT RECEIVED

FIG.9A

| INDEX | NODE ID | PNC1 | PNC2 | ... | PNCn |
|---|---|---|---|---|---|
| 0 | 1 | 1 | 0 | ... | 0 |
| 1 | 3 | 1 | 1 | ... | 0 |
| 2 | 5 | 0 | 1 | ... | 1 |
| 3 | 10 | 0 | 0 | ... | 1 | n : NUMBER OF PN SYSTEMS PRESENT IN ON-BOARD NETWORK SYSTEM
PNCn VALUE :
1 : BELONGS TO PNCn
0 : DOES NOT BELONG TO PNCn

FIG.9B

| INDEX | RECEPTION OF SLEEP-ENTERED MESSAGE |
|---|---|
| 0 | PNC1 (SUBJECT IDENTIFIER)···1(MANAGEMENT INFORMATION) |
| 1 | PNC1···1, PNC2···0 |
| 2 | PNC2···0, PNCn···1 |
| 3 | PNCn···1 |

1 : RECEIVED, 0 : NOT RECEIVED

ON-BOARD NETWORK SYSTEM

CROSS-REFERENCE TO RELATED APPLICATION

This application is based on and claims the benefit of priority from earlier Japanese Patent Application No. 2012-178171 filed Aug. 10, 2012, the description of which is incorporated herein by reference.

BACKGROUND OF THE INVENTION

1. Technical Field

The present invention relates to an on-board network system comprising a plurality of electronic control units that are communicably connected with each other over a communication bus to share control messages accompanying control of on-board devices mounted in a vehicle, and providing a network management function.

2. Description of the Related Art

Conventionally, numerous electronic control units (ECUs) are mounted in a vehicle to control on-board devices. An on-board network system includes the ECUs being disposed on a communication bus.

In an on-board network system such as this, each ECU transmits control messages to the communication bus. The control messages include various detection values indicating the state of the vehicle, commands issued to the on-board devices, and the like. The control messages are shared among other ECUs, thereby actualizing efficient and comprehensive vehicle control.

In addition, in the on-board network system, a network management (NM) function is being reinforced in accompaniment with the increase in the number of ECUs mounted in the vehicle. Here, the NM function is provided to manage whether nor not each ECU is operating normally. The operations of the ECU include a so-called bus-sleep operation. In the bus-sleep operation, when control messages are not required to be transmitted and received over the communication bus, each ECU transitions, for example, its own communication controller and transceiver to power-saving mode, thereby transitioning from a "normal state" to a "power-saving state", to suppress power consumption of the overall system.

In addition, as a working of the bus-sleep operation, a situation is known in which, in the normal state, each ECU periodically transmits a network management (NM) message indicating that transition to the power-saving state is not possible. When transition to the power-saving state becomes possible, the ECU ceases transmission of the NM message. In addition, when the NM messages from other ECUs are no longer received, the ECU transitions from the normal state to the power-saving state.

In other words, when each ECU is no longer required to use the communication bus for itself and is no longer required to use the communication bus for the other ECUs, control messages are no longer required to be transmitted and received. Therefore, the ECU transitions from the normal state to the power-saving state. In some instances, in addition to the communication controller and transceiver of the ECU entering power-saving mode, power supply to the microcomputer of the ECU may also be stop. Power supply to the microcomputer being stopped in this way is referred to as microcomputer-sleep.

In this type of on-board network system, a system is known in which an ECU (relay device) that relays the transmission and reception of control messages between a plurality of communication buses monitors the operating state of other ECUs (nodes). Depending on whether the node that is the transmission source is in the normal state or the power-saving state, the ECU (relay device) relays or stops relaying the NM messages (for example, refer to JP-A-2011-87112).

However, in the conventional on-board network system, the operating state of a node is judged only based on whether or not the NM message has been received. Therefore, a problem occurs in that it cannot be determined whether the node has ceased transmitting the NM message because of a normal operation or is unable to transmit the NM message because of some sort of malfunction (abnormality). In other words, in the latter instance, a problem occurs in that the abnormal operation of the node cannot be favorably detected in the NM function.

Therefore, an on-board network system providing an NM function is desired that is capable of efficiently detecting operation abnormality in the system.

SUMMARY

As an exemplary embodiment, the present application provides an on-board network system including a plurality of electronic control units that are communicably connected with each other over a communication bus.

The plurality of electronic control units are configured by a plurality of common nodes (hereinafter referred to as "nodes") and a master node (hereinafter referred to as "master"). The nodes perform a state transition process for transitioning from a normal state in which control messages can be transmitted and received to a power-saving state in which control messages cannot be transmitted or received, according to a sleep condition set in advance. The master performs an abnormality detection process for detecting an abnormality related to the state transition process for each node.

In a configuration such as this, each node periodically transmits a network management (NM) message to the communication bus. The NM message indicates that the node itself is unable to transition to the power-saving mode. When the node is able to transition to the power-saving mode, the node itself ceases transmitting the NM message. In addition, when a period (hereinafter referred to as "NM-ceased period") during which NM messages are not received from other electronic control units over the communication bus exceeds a wait period set in advance, the sleep condition is met.

In the state transition process performed by each node, when the sleep condition is met, the node transmits a sleep-entered message to the communication bus. The sleep-entered message indicates that the sleep condition is met. On the other hand, in the abnormality detection process performed by the master, abnormality related to the state transition process performed by each node is detected based on whether or not the sleep-entered message has been received.

In a configuration such as this, based on whether or not a message (sleep-entered message) voluntarily transmitted by the node during a bus-sleep operation accompanying the state transition process has been received, for example, when the master receives a number of sleep-entered messages amounting to the number of nodes, the master can judge that all nodes are operating normally. When the number of sleep-entered messages is insufficient, the master can judge that an abnormality has occurred in a node within the system.

Therefore, in the on-board network system according to the exemplary embodiment, in addition to abnormality detection while the node is in the normal state, abnormality detection during the bus-sleep operation can also be favorably performed. Therefore, operation abnormality in a system providing the NM function can be efficiently detected.

BRIEF DESCRIPTION OF THE DRAWINGS

In the accompanying drawings:

FIG. 4A shows a first embodiment of a network configuration table, and FIG. 4B shows a first embodiment of buffer management information;

FIG. 9A shows a second example of the network configuration table, and FIG. 9B shows a second example of the buffer management information;

DETAILED DESCRIPTION OF THE PREFERRED EMBODIMENTS

First Embodiment

An on-board network system according to a first embodiment of the present invention will hereinafter be described with reference to the FIG. 1 to FIG. 7.

[Overall Configuration]

Figure 1:
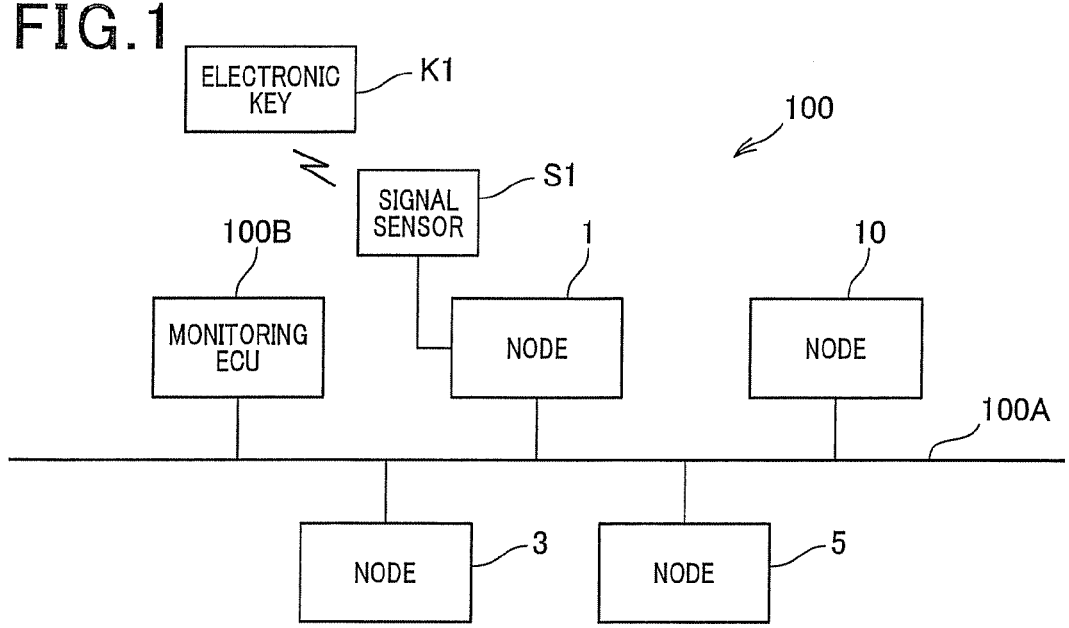
FIG. 1 shows a block diagram showing a first embodiment of an on-board network system.

As shown in FIG. 1, in an on-board network system 100, numerous electronic control units (ECUs) mounted in a vehicle are connected by a communication bus 100A. ECUs compose nodes 1, 3, 5, 10, and a master 100B. The master 100B corresponds to monitoring ECU. Each nodes 1, 3, 5, 10 and a master 100B transmits and receives control messages to and from each other over the communication bus 100A, thereby sharing various detection values indicating the state of the vehicle, commands issued to on-board devices, and the like. The on-board network system 100 actualizes efficient and comprehensive vehicle control. The on-board devices include the ECUs, and devices and electrical equipment (referred to, hereinafter, as "controlled devices") other than the ECUs that configure the vehicle.

The on-board network system 100 also provides a network management (NM) function. Among the numerous ECUs, the monitoring ECU 100B is included. The monitoring ECU 100B serves as a master which monitors whether or not the other ECUs (nodes 1, 3, 5, and 10) are operating normally.

Figure 2:
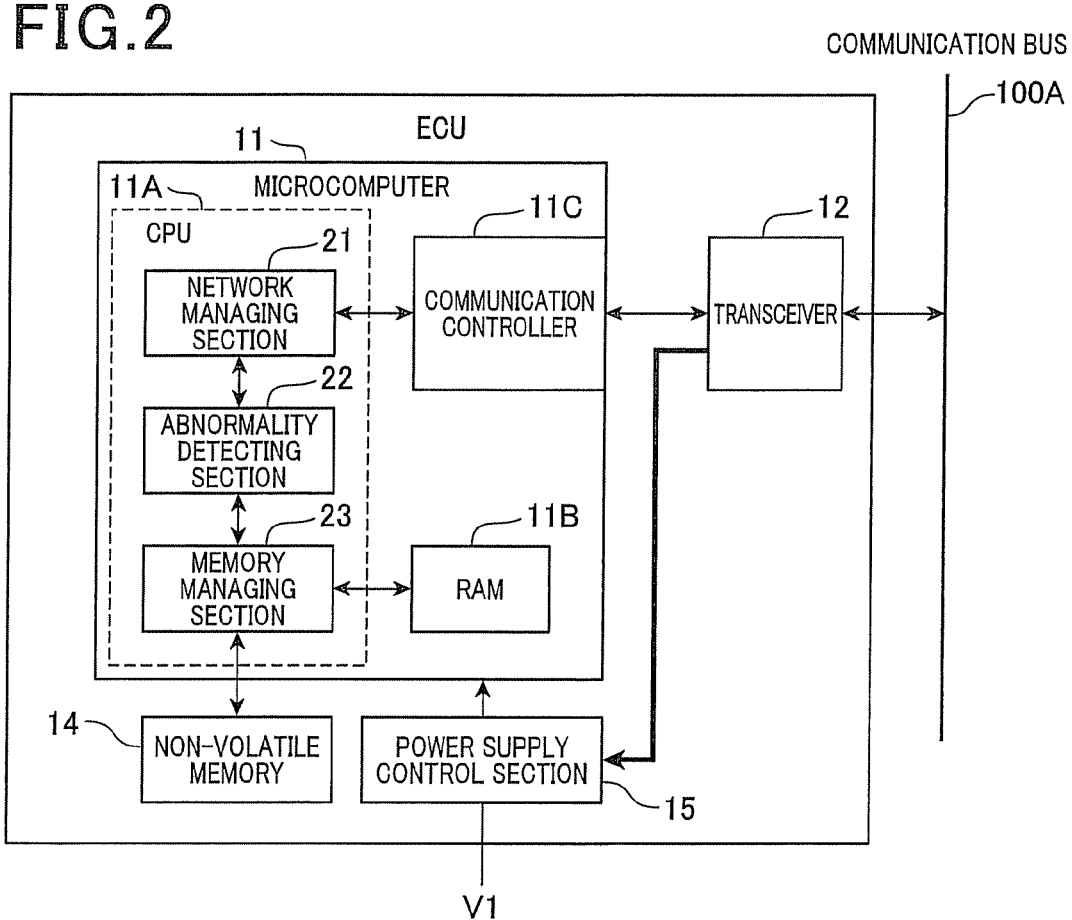
FIG. 2 shows a first embodiment of a master and a node.

As shown in FIG. 2, each node 1, 3, 5, and 10 and the monitoring ECU 100B (in other words, all ECUs) share a common configuration that includes a known microcomputer 11, a transceiver 12, a non-volatile memory 14, and a power supply control section 15.

The microcomputer 11 includes a central processing unit (CPU) 11A, a random access memory (RAM) 11B, and a communication controller 11C. The CPU 11A performs various processes related to vehicle control using the RAM 11B as a work area, based on programs stored in, for example, the non-volatile memory 14. The CPU 11A outputs commands for operating the controlled devices to the controlled devices. The CPU 11A also generates control messages indicating detection values inputted from the controlled devices, commands issued to the on-board devices (including other ECUs), and the like.

The communication controller 11C transmits the control messages generated by the CPU 11A to the communication bus 100A based on a predetermined protocol. The communication controller 11C also receives control messages from other ECUs over the communication bus 100A, and transmits the control messages to the CPU 11A. The protocol refers to communication rules for transmitting and receiving control messages among ECUs. For example, a known controller area network (CAN) protocol is used.

The transceiver 12 is connected to the communication controller 11C and the communication bus 100A. The transceiver 12 converts voltage signals (analog signals) flowing over the communication bus 100A to digital data and transmits the digital data to the communication controller 11C. The transceiver 12 also converts the control messages (digital data) transmitted from the communication controller 11C to analog signals and transmits the analog signals to the communication bus 100A.

The non-volatile memory 14 stores therein programs and data that should be held even when supply from a battery V1 is interrupted. The power supply control section 15 is connected to the battery V1 of the vehicle. The power supply control section 15 controls power supply from the battery V1 to the microcomputer 11.

Specifically, the power supply control section 15 is also connected to the communication bus 100A via the transceiver 12. For example, during microcomputer-sleep when power supply to the microcomputer 11 is stopped, when a predetermined startup signal is inputted from the communication bus 110A via the transceiver 12, the power supply control section 15 resumes power supply to the microcomputer 11 and transitions the communication controller 11C and the transceiver 12 from the power-saving state to the normal state.

In the on-board network system 100 according to the first embodiment, the power supply control section 15 of each ECU is configured to perform control related to power supply as described above. Each ECU transmits the above-described startup signal as required by itself to the communication bus 100A, thereby starting a bus wakeup operation of the other ECUs.

On the other hand, the transition of each ECU from a state in which control messages can be transmitted (normal state) to a state in which control messages cannot be transmitted (power-saving state) will be described hereafter.

[State Transition Process]

Figure 3:
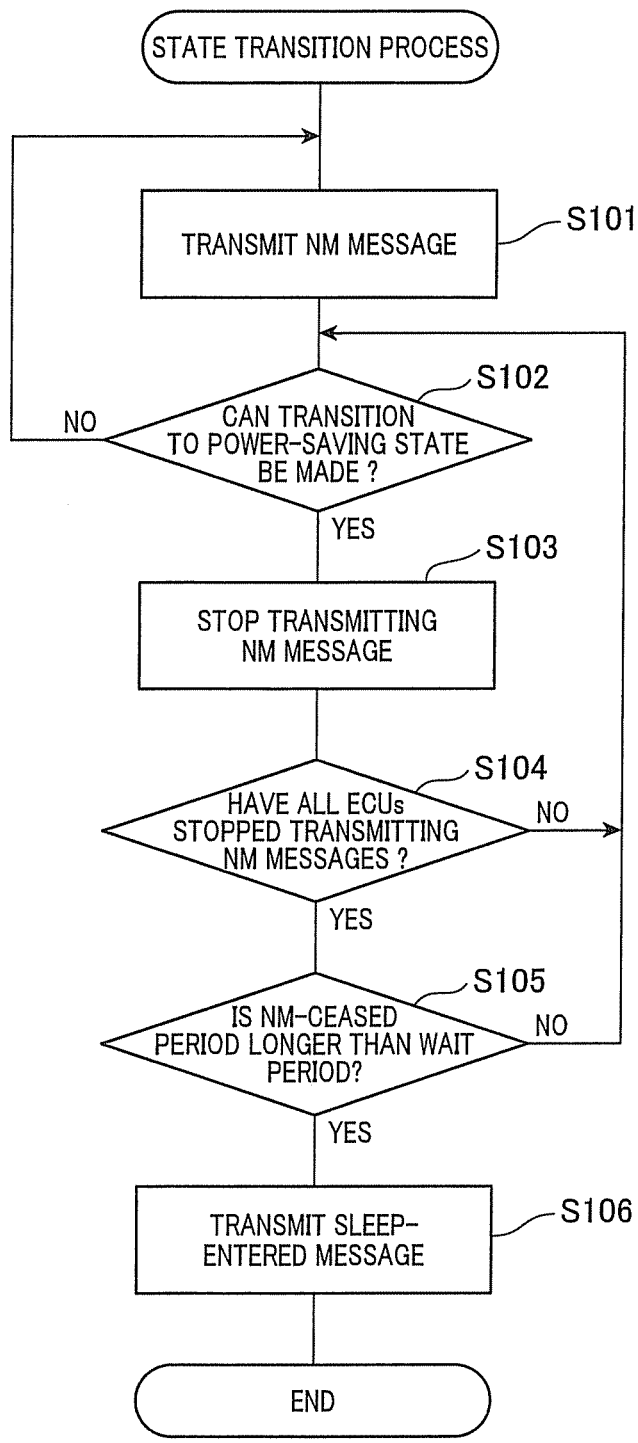
FIG. 3 shows a flowchart of an example of a state transition process performed by each node.

The microcomputer 11 of each ECU performs a state transition process shown in FIG. 3. In other words, in the normal state, the microcomputer 11 transmits a control message (corresponds to a "network management message, hereinafter referred to as "network NM message") to the communication bus 100A at a constant interval (S101). The NM message indicates that the ECU itself cannot transition to the power-saving state. In other words, the microcomputer 11 transmits to the other ECUs that control may be affected should its own ECU transition to the power-saving state. Then, when a predetermined trigger is generated, the microcomputer 11 judges whether or not its own ECU can transition from the normal state to the power-saving state (step S102). When judged that the transition can be made ("YES" at step S102), the microcomputer 11 stops transmitting the NM message (step S103). In other words, the microcomputer 11 transmits to the other ECUs that control will not be affected even should its own ECU transition to the power-saving state. When judged at S102 that the transition to the power-saving state cannot be made ("NO" at step S102), the microcomputer 11 continues performing the processing operation at step S101.

The microcomputer 11 waits until NM messages are no longer received from any other ECU on the communication bus 100A (step S104). When judged that no NM messages are received ("YES" at step S104), the microcomputer 11 sets a timer and judges whether or not the period (NM-ceased period) over which no NM messages are received exceeds a wait period that is set in advance (step S105). When judged that the NM-ceased period exceeds the wait period ("YES" at step S105), the microcomputer 11 judges that the sleep condition for its own ECU is met. In other words, the sleep condition is that all other ECUs, in addition to its own ECU, are confirmed to be in a state in which the transition to the power-saving state can be made. When judged at step S104 that an NM message has been received from any ECU ("NO" at step S104), the microcomputer 11 continues to perform the processing operation at step S102. When judged at S105 that the NM-ceased period does not exceed the wait period ("NO" at step S105), the microcomputer 11 returns to step S102.

When judged that the NM-ceased period exceeds the wait period ("YES" at step S105), the microcomputer 11 of each node transmits a control message (sleep-entered message) to the communication bus 100A (step S106). The sleep-entered message indicates that the sleep condition is met. The sleep-entered message includes at least a node identifier (ID) for identifying the ECU (at least the node) that is the transmission source of the message. The above-described NM message also includes the node ID. A CAN ID can be used as the node ID.

Here, a configuration in which the on-board network system 100 includes keyless entry system, such as that shown in FIG. 1, will be described as an example. The keyless entry system includes the node 1, the node 3, the node 5, and the monitoring ECU 100B. In the node 1, a signal sensor S1 is connected to the microcomputer 11 of the ECU itself. The signal sensor 51 receives a wireless signal (keyless signal) from an electronic key K1 held by the user of the vehicle. The node 3 locks and unlocks the vehicle door. The node 5 turns on the vehicle lights.

Specifically, in the keyless entry system, when the vehicle power supply is turned OFF (but the background power supply is ON at all times), power is supplied only to the signal sensor S1 and the microcomputer 11 of the node 1. When the vehicle power supply is turned OFF in this way and the signal sensor S1 receives a keyless signal, the microcomputer 11 of the node 1 checks whether or not a code included in the keyless signal is legitimate. When the code is authenticated as a legitimate code, the microcomputer 11 performs a bus wakeup operation of its own node and returns to the normal state. In addition, the microcomputer 11 transmits a startup signal to the communication bus 100A, thereby starting the bus wakeup operation of the monitoring ECU 100B, the node 3, the node 5, and another node 10. The node 10 represents nodes within the on-board network system that do not belong to the keyless entry system.

Then, when the bus wakeup operation is completed, the node 3 and the node 5 receive a control message indicating a command from the node 1. The node 3 unlocks the door. The node 5 turns on the hazard lights as an answerback to the user of the vehicle. In addition, when the bus wakeup operation is completed, each node periodically transmits the NM message to the communication bus 100A.

On the other hand, when the ignition switch (IG switch) of the vehicle is turned ON by the electronic key K1, the node 1 stops transmitting the NM message after the elapse of a predetermined period. Next, the other nodes also stop transmitting the NM message each time a predetermined trigger is generated. For example, when the IG switch switches from ON to OFF, the node 5 and the node 10 stop transmitting the NM message. When the door is locked by the electronic key K1, the node 3 stops transmitting the NM message.

When all ECUs stop transmitting the NM messages in this way, the sleep condition is met. Each node transmits the sleep-entered message including the node ID corresponding to itself to the communication bus 100A and transitions from the normal state to the power-saving state.

[Configuration of the Monitoring ECU]

Next, the differences with the other nodes in the configuration of the monitoring ECU 100B will be described.

As shown in FIG. 2, the CPU 11A of the monitoring ECU 100B includes, when functionally divided, a network managing section 21, an abnormality detecting section 22, and a memory managing section 23. The network managing section 21 transmits and receives the control messages to and from the communication controller 11C. The abnormality detecting section 22 detects an abnormal operation in the nodes. The memory managing section 23 manages the RAM 11B and the non-volatile memory 14.

In addition, as shown in FIG. 4A, the non-volatile memory 14 stores therein a network configuration table 31 in which indexes indicating addresses within a memory in the RAM 11B and node IDs are associated.

On the other hand, as shown in FIG. 4B, the RAM 11B is provided with a buffer 32 that serves as an area for temporarily storing management information indicating whether or not a sleep-entered message has been received for each index.

[Buffer Update Process]

Here, a buffer update process performed by the CPU 11A of the monitoring ECU 100B as a function of the memory managing section 23 will be described with reference to the flowchart in FIG. 5.

When the buffer update process is started, first, based on the sleep-entered message received by the network managing section 21, the memory managing section 23 identifies the node ID included in the message (step S201). Then, the memory managing section 23 extracts the index associated with the node ID identified at step S201 from the network configuration table 31 (step S202). Next, the memory managing section 23 rewrites the management information corresponding to the index extracted at step S202 in the buffer 32 from 0 (zero) indicating that the sleep-entered message has not been received to 1 indicating that the sleep-entered message has been received, thereby updating the buffer 32 (step S203).

[Buffer Reset Process]

The memory managing section 23 performs a process (buffer reset process) for resetting the buffer 32 in preparation for the bus sleep in the on-board network system 100. The judgment regarding the timing at which the CPU 11A of the monitoring ECU 100B performs the buffer reset process as a function of the memory managing section 23 will be described with reference to the flowchart in FIG. 6.

Figure 6:
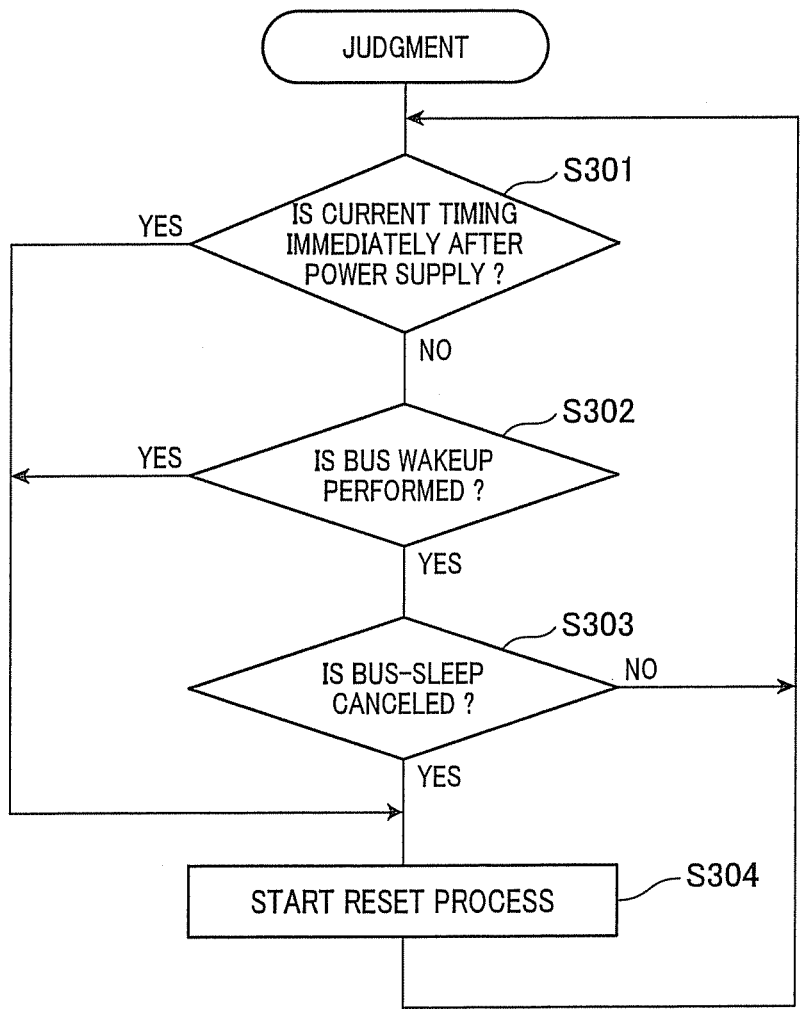
FIG. 6 shows a flowchart of a first embodiment of timing at which a buffer reset process is performed.

As shown in FIG. 6, the memory managing section 23 judges whether or not the current timing is immediately after power supply to the microcomputer 11 (step S301). When judged that the current timing is immediately after power supply to the microcomputer 11 ("YES" at step S301), the memory managing section 23 starts the buffer restart process.

In addition, after the bus sleep of the on-board network system 100 is confirmed based on the result of the above-described buffer update process, the memory managing section 23 judges whether or not at least one node has performed the bus wakeup operation based on whether or not the NM message has been received (step S302). When judged that a bus wakeup such as this is detected ("YES" at step step S302), the memory managing section 23 starts the buffer reset process.

In addition, the memory managing section 23 judges whether or not a node is present that performs an operation (bus-sleep cancel operation) to terminate the above-described state transition process by a predetermined trigger after transmitting the sleep-entered message, based on, for example, whether not a node that performs re-transmission of the NM message is present during the above-described NM-ceased period (step S303). When judged that a bus-sleep cancelation such as this is detected ("YES" at step S303), the memory managing section 23 starts the buffer reset process.

When the buffer reset process is started, all pieces of management information within the buffer 32 are reset to 0 (zero).

[Abnormality Detection Process]

Figure 7:
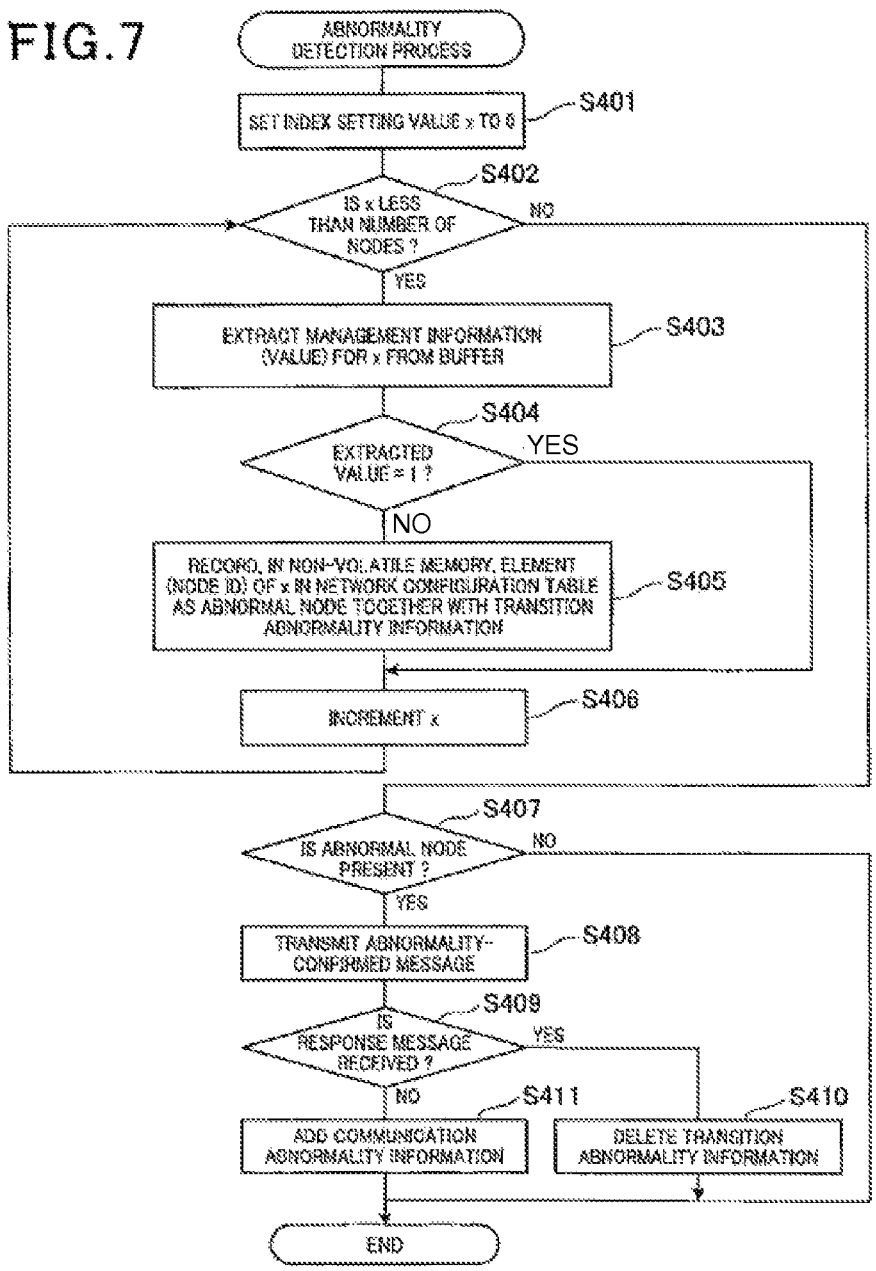
FIG. 7 shows a flowchart of a first embodiment of processing operations in an abnormality detection process.

Next, an abnormality detection process performed by the CPU 11A of the monitoring ECU 100B as a function of the abnormality detecting section 22 will be described with reference to the flowchart in FIG. 7. The abnormality detection process is started when a sleep completion period has elapsed. The sleep completion period, which is set in advance, is a period until all nodes 1, 3, 5, and 10 complete the state transition process after the network managing section 21 has received at least one sleep-entered message.

When the abnormality detection process is started, first, the abnormality detecting section 22 sets an index value (x=0) indicating the head address in the buffer 32 (step S401). Next, the abnormality detecting section 22 judges whether or not the index setting value x is smaller than a value corresponding to the total number of nodes (step S402). When judged "YES" at step S402, the abnormality detecting section 22 proceeds to step S403. When judged "NO" at step S402, the abnormality detecting section 22 proceeds to step S407, described hereafter.

At step S403, the abnormality detecting section 22 extracts the management information corresponding to the index setting value x from the buffer 32. Then, the abnormality detecting section 22 judges whether or not the management information extracted at step S403 is 1 indicating that the sleep-entered message has been received (step S404). Here, when judged "YES" at step S404, the abnormality detecting section 22 proceeds to step S406. When judged "NO" at step S404, the abnormality detecting section 22 proceeds to step S405. In other words, when judged that the management information extracted at step S403 is 0 (zero) indicating that the sleep-entered message has not been received, the abnormality detecting section 22 proceeds to step S405.

At step S405, the abnormality detecting section 22 records, in the non-volatile memory 14, the node ID corresponding with the index setting value x in the network configuration table 31 together with information (transition abnormality information) indicating that the node is a node (abnormal node) having at least an abnormality related to the state transition process. On the other hand, the abnormality detecting section 22 increments the index setting value x at step S406 and returns to step S402.

At step S407, the abnormality detecting section 22 judges whether or not an abnormal node is detected in the processing operations at step S401 to S406. When judged "YES" at step S407, the abnormality detecting section 22 proceeds to step S408. When judged NO at step S407, the abnormality detecting section 22 ends the abnormality detection process.

At step S408, the abnormality detecting section 22 transmits an abnormality-confirmed message indicating that the node has been recorded as an abnormal node at step S405 to the relevant node. Next, the abnormality detecting section 22 judges whether or not some sort of response message in response to the abnormality-confirmed message transmitted at step S408 has been received from the node that is the transmission destination of the abnormality-confirmed message (step S409). When judged "YES" at step S409, the abnormality detecting section 22 deletes, from the non-volatile memory 14, the transition abnormality information indicating that the relevant node is an abnormal node together with the node ID (step S410) and ends the abnormality detection process.

On the other hand, the abnormality detecting section 22 adds, to the relevant node ID at S405, information (communication abnormality information) indicating that the node has an abnormality related to the communication function regarding the node from which a response message has not been received at step S409.

In other words, in the abnormality detection process, when the process is started after the elapse of the above-described sleep completion period, whether or not the sleep-entered message has been received is confirmed using the node ID included in the sleep-entered message. Nodes from which the message has been received are normal nodes. Nodes from which the message has not been received are abnormal nodes and recorded as abnormal nodes.

[Effects]

As described above, in the on-board network system 100 according to the first embodiment, depending on whether or not a message (sleep-entered message) voluntarily transmitted by each node during the bus sleep operation accompanying the state transition process has been received, when the number of sleep-entered messages received by the monitoring ECU 100B does not reach the total number of nodes, a judgment is made that an abnormal node is present within the system.

Therefore, in the on-board network system 100, in addition to the abnormality detection during the normal state of each node, abnormality detection can also be favorably performed during the bus sleep operation. Therefore, operation abnormality in the system can be favorably detected.

In addition, in the on-board network system 100, the node ID is included in the sleep-entered message. The monitoring ECU 100B manages the node IDs and uses the node IDs in the sleep-entered messages to record a node that has not transmitted the sleep-entered message as an abnormal node.

Therefore, as a result of the monitoring ECU 100B managing the node IDs, the node within the system that has an abnormality can be identified. As a result of the identified abnormal node being recorded, repair operation of the system when an abnormality occurs can be facilitated.

In addition, in the on-board network system 100, the monitoring ECU 100B has the buffer 32 for temporarily storing therein management information indicating whether or not the sleep-entered message has been received. When the microcomputer 11 is turned ON, during bus wakeup when at least one of the plurality of nodes transitions from the power-saving state to the normal state, and during bus sleep cancelation when at least one of the plurality of nodes terminates the state transition process, the monitoring ECU 100B resets the buffer 32.

Therefore, because the buffer 32 can be reset with certainty before the bus sleep operation, whether or not the sleep-entered message has been received can be favorably confirmed using the management information during the bus sleep operation.

In the on-board network system 100, the NM-ceased period is the period during which NM messages are not received from any of the other ECUs on the communication bus 100A. Therefore, for example, all nodes on the communication bus 100A can be made to perform the bus sleep operation at once.

In addition, in the on-board network system 100, the monitoring ECU 100B transmits the abnormality-confirmed message to the abnormal node. Depending on whether or not a response message in response to the abnormality-confirmed message has been received, the monitoring ECU 100B updates or deletes the record of the abnormal node.

Therefore, in the on-board network system 100, whether the sleep-entered message is not being transmitted merely because of a delay in transmission, or because of a communication abnormality can be judged. The accuracy of detection regarding communication abnormality can be enhanced.

Second Embodiment

Next, an on-board network system according to a second embodiment of the present invention will be described with reference to the FIG. 8 to FIG. 12. According to the second embodiment, the differences with the first embodiment will mainly be described. Unless specifically described, description of each constituent element will be omitted through use of the same reference numbers as those according to the first embodiment.

[Overall Configuration]

Figure 8:
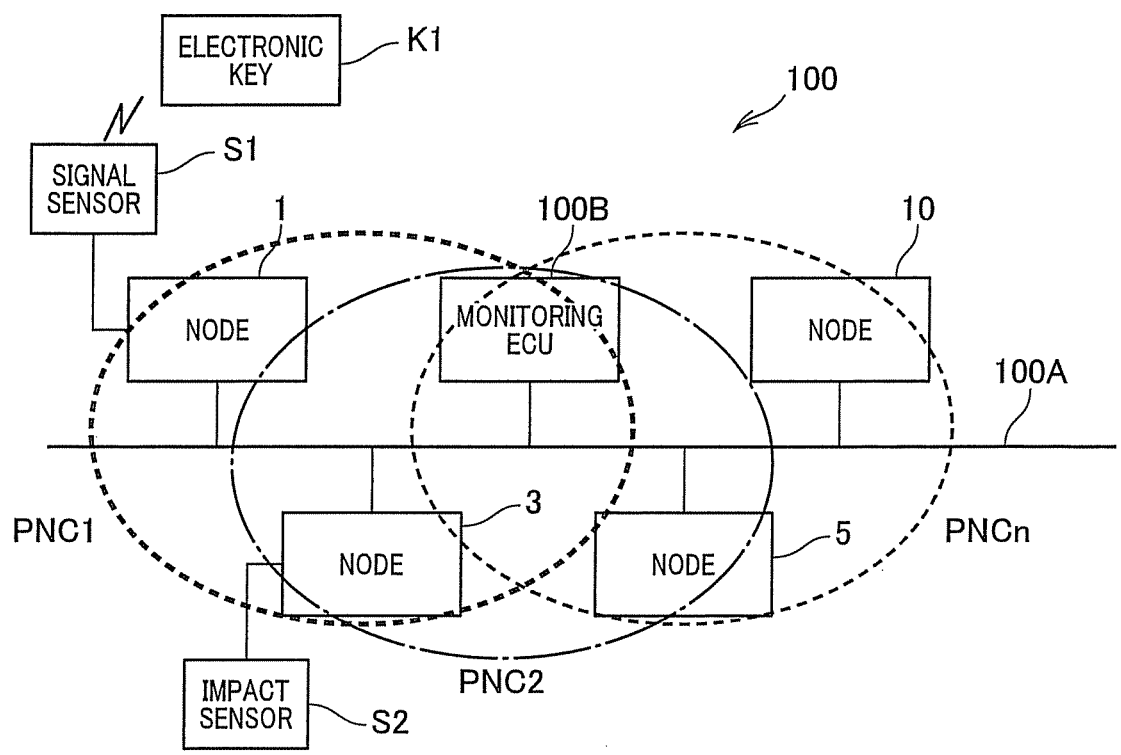
FIG. 8 shows a block diagram showing a second embodiment of the on-board network system.

As shown in FIG. 8, the on-board network system 100 according to the second embodiment differs from that according to the first embodiment in that each ECU belongs to at least one of a plurality of groups divided in advance on the communication bus 100A. In addition, a node is present that belongs to a plurality of groups.

[State Transition Process]

According to the second embodiment, in the state transition process shown in FIG. 3, at step S101, the microcomputer 11 of each node periodically transmits an NM message to the communication bus 100A. The NM message includes a subject identifier in addition to the node ID identifying the node itself. The subject identifier indicates a group ID to which the message is being transmitted, among one or a plurality of group IDs identifying the groups to which the node itself belongs. In other words, the second embodiment differs from the first embodiment in that the NM message includes information (subject identifier) identifying one or a plurality of groups that is the transmission destination.

When the node belongs to a plurality of groups, at step S102, the microcomputer 11 judges whether or not its own ECU can transition from the normal state to the power-saving state for each group. At step S103, the microcomputer 11 continues to periodically transmit NM messages to the communication bus 100A, excluding the NM message having the subject identifier corresponding to the group judged to be unable to transition to the power-saving state at step S102. The second embodiment differs from the first embodiment in that the microcomputer 11 stops transmitting the NM message at step S103 when judged at step S102 that the transition from the normal state to the power-saving state can be made for all groups to which its own ECU belongs.

In addition, when the node belongs to a plurality of groups, at step S104, based on the subject identifier included in the NM message, the microcomputer 11 waits until the NM message including the subject identifier for the group is no longer being received from any of the other nodes belonging to the group, for each group. Every time the microcomputer 11 judges "YES" at step S104, at step S105, the microcomputer 11 judges whether or not the NM-ceased period exceeds the wait period. In other words, the second embodiment differs from the first embodiment in that the NM-ceased period is a period during which the NM message including the subject identifier has not been received from any other node within the group (subject group) for each subject identifier. In addition, the second embodiment differs from the first embodiment in that the sleep condition is confirmation that the node itself is in a state in which control is not affected even should the node transitions from the power-saving state to the normal state in the subject group, and all other nodes within the subject group are able to transition to the power-saving state in the subject group.

Furthermore, the second embodiment differs from the first embodiment in that, when the node belongs to a plurality of groups, at step S106, the microcomputer 11, transmits to the communication bus 100A, a sleep-entered message including the subject identifier indicating the subject group that meets the sleep condition, in addition to the node ID identifying its own node.

For example, a configuration will be described as an example in which, in the on-board network system 100, the keyless entry system described according to the first embodiment is one group and given the reference number PNC1, and a security system is another group and given the reference number PNC2. The on-board network system 100 in this example includes the keyless entry system PNC1 and the security system PNC2. The second embodiment differs from the first embodiment in that, in the on-board network system 100, the node 3 for locking and unlocking the vehicle door is a node belonging to a plurality of groups, or in other words, both the keyless entry system PNC1 and the security system PNC2. The node 5 does not belong to the keyless entry system PNC1, and belongs to the security system PNC2 and a system PNCn that is a representative of other groups.

The security system PNC2 includes the node 3, the node 5, and the monitoring ECU 100B. In the node 3, an impact sensor S2 is connected to its own microcomputer. The impact sensor S2 detects impact that may damage the vehicle doors or windows. The node 5 is used to output a warning sound for security that is emitted outside of the vehicle. The monitoring ECU 100B belongs to all systems PNC1 to PNCn.

Specifically, in the on-board network system 100, when the vehicle power supply is OFF, power is supplied to the impact sensor S2 and the microcomputer 11 of the node 3, in addition to the signal sensor S1 and the microcomputer 11 of the node 1. When the vehicle power supply is turned OFF in this way, if the impact sensor S2 detects, for example, an acceleration exceeding a reference value, the microcomputer 11 returns to the normal state by performing the bus wakeup operation of its own node. The microcomputer 11 transmits a startup signal corresponding to the security system PNC2 to the communication bus 100A. As a result, the monitoring ECU 100B, the node 3, and the node 5 start the bus wakeup operation.

Then, when the bus wakeup operation is completed, the node 5 receives a control message indicating a command from the node 3. The node 5 generates a warning sound outside of the vehicle. In addition, when the bus wakeup operation is completed, the node 3 and the node 5 periodically transmit, to the communication bus 100A, the NM message including the subject identifier corresponding to the security system PNC2.

On the other hand, when the keyless entry system PNC1 (in this instance, the node 1) subsequently returns from the power-saving state to the normal state as a result of the signal sensor S1 receiving a legitimate keyless signal, as described above, the node 1 periodically transmits, to the communication bus 100A, the NM message including the subject identifier corresponding to the keyless entry system PNC1. Then, for example, using this as a trigger, the node 3 and the node 5 stop transmitting the NM message including the subject identifier corresponding to the security system PNC2.

When the node 3 and the node 5 stop transmitting the NM message including the subject identifier corresponding to the security system PNC2 in this way, the sleep condition related to the security system PNC2 is met. The node 3 and the node 5 transmit, to the communication bus 100A, the sleep-entered message including the node ID corresponding to themselves and the subject identifier corresponding to the security system PNC2. First, only the node 5 transitions from the normal state to the power-saving state.

On the other hand, the node 3 belongs to the keyless entry system PNC1 as well as the security system PNC2. Therefore, after the door is unlocked by the electronic key K1 and the sleep condition related to the keyless entry system PNC1 is met, as described above, the node 3 transmits, to the communication bus 100A, the sleep-entered message including the node ID corresponding to itself and the subject identifier corresponding to the keyless entry system PNC1. The node 3 then transitions from the normal state to the power-saving state.

In other words, because the node 3 belongs to a plurality of groups, the node 3 transitions from the normal state to the power-saving state when the sleep condition is met for all groups to which the node itself belongs. According to the second embodiment, an example is described in which the sleep-entered message is transmitted to the communication bus 100A every time the sleep condition is met for a group to which the node itself belongs. However, the sleep-entered message may be transmitted to the communication bus 100A when the sleep condition is met for all groups to which the node itself belongs.

[Configuration of the Monitoring ECU]

Next, the differences with the first embodiment in the configuration of the monitoring ECU 100B according to the second embodiment will be described.

In the monitoring ECU 100B according to the second embodiment, as shown in FIG. 9A, the non-volatile memory 14 stores therein a network configuration table 31. In the network configuration table 31, an index indicating an address within a memory of the RAM 11B is associated with a node ID, and the group ID to which the node ID belongs is written for each node ID.

On the other hand, as shown in FIG. 9B, the RAM 11B is provided with the buffer 32 that serves as an area for temporarily storing management information indicating whether or not a sleep-entered message has been received for each index. The buffer 32 temporarily stores therein the management information to indicate whether or not the sleep-entered message has been received for each subject identifier.

[Buffer Update Process]

Figure 5:
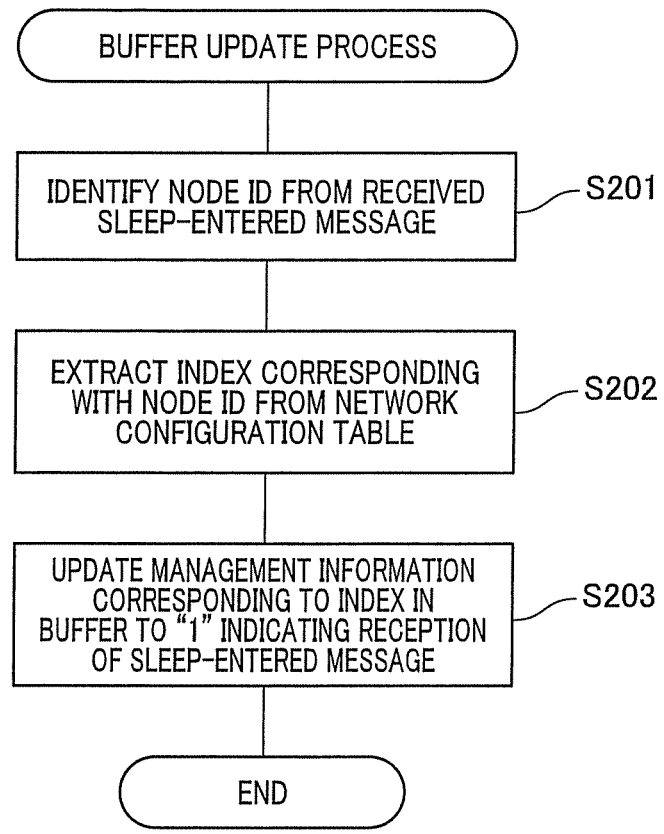
FIG. 5 shows a flowchart of a first embodiment of processing operations in a buffer update process.

Then, in the buffer update process shown in FIG. 5, at step S203, the memory managing section 23 rewrites, among the pieces of management information in the buffer 32 corresponding to the indexes extracted at step S202, the management information related to the subject identifier included in the sleep-entered message received by the network managing section 21 from 0 (zero) indicating that the sleep-entered message has not been received to 1 indicating that the sleep-entered message has been received, thereby updating the buffer 32.

[Buffer Reset Process]

Next, in the judgment regarding the timing for performing the buffer reset process shown in FIG. 6, the memory managing section 23 judges whether or not the current timing is immediately after power supply to the microcomputer 11 (step S301). When judged that the current timing is immediately after power supply to the microcomputer 11 ("YES" at step S301), the memory managing section 23 starts the buffer restart process. Here, when the buffer reset process is started, all pieces of management information within the buffer 32 are reset to 0 (zero).

In addition, after the bus sleep state of a certain group is confirmed based on the result of the above-described buffer update process, the memory managing section 23 judges whether or not at least one node in the group has performed the bus wakeup operation based on whether or not the NM message has been received (step S302). When judged that a bus wakeup such as this is detected ("YES" at step S302), the memory managing section 23 starts the buffer reset process. Here, when the buffer rest process is started, all pieces of management information within the buffer 32 regarding only the subject identifier in the NM message by which the bus wakeup is detected at step S302 are reset to 0 (zero).

In addition, the memory managing section 23 judges whether or not a node is present that performs an operation (bus-sleep cancel operation) to terminate the above-described state transition process by a predetermined trigger after transmitting the sleep-entered message, based on, for example, whether not a node that performs re-transmission of the NM message is present during the above-described NM-ceased period (step S303). When judged that a bus-sleep cancelation such as this is detected ("YES" at step S303), the memory managing section 23 starts the buffer reset process. Here, when the buffer rest process is started, all pieces of management information within the buffer 32 regarding only the subject identifier in the NM message by which the bus-sleep cancelation is detected at step S303 are reset to 0 (zero).

[Abnormality Detection Process]

The abnormality detection process according to the second embodiment is started when a sleep completion period has elapsed. The sleep completion period, which is set in advance, is a period until all nodes within a group corresponding to the subject identifier included in the sleep-entered message complete the state transition process, after the network managing section 21 has received at least one sleep-entered message.

Figure 10:
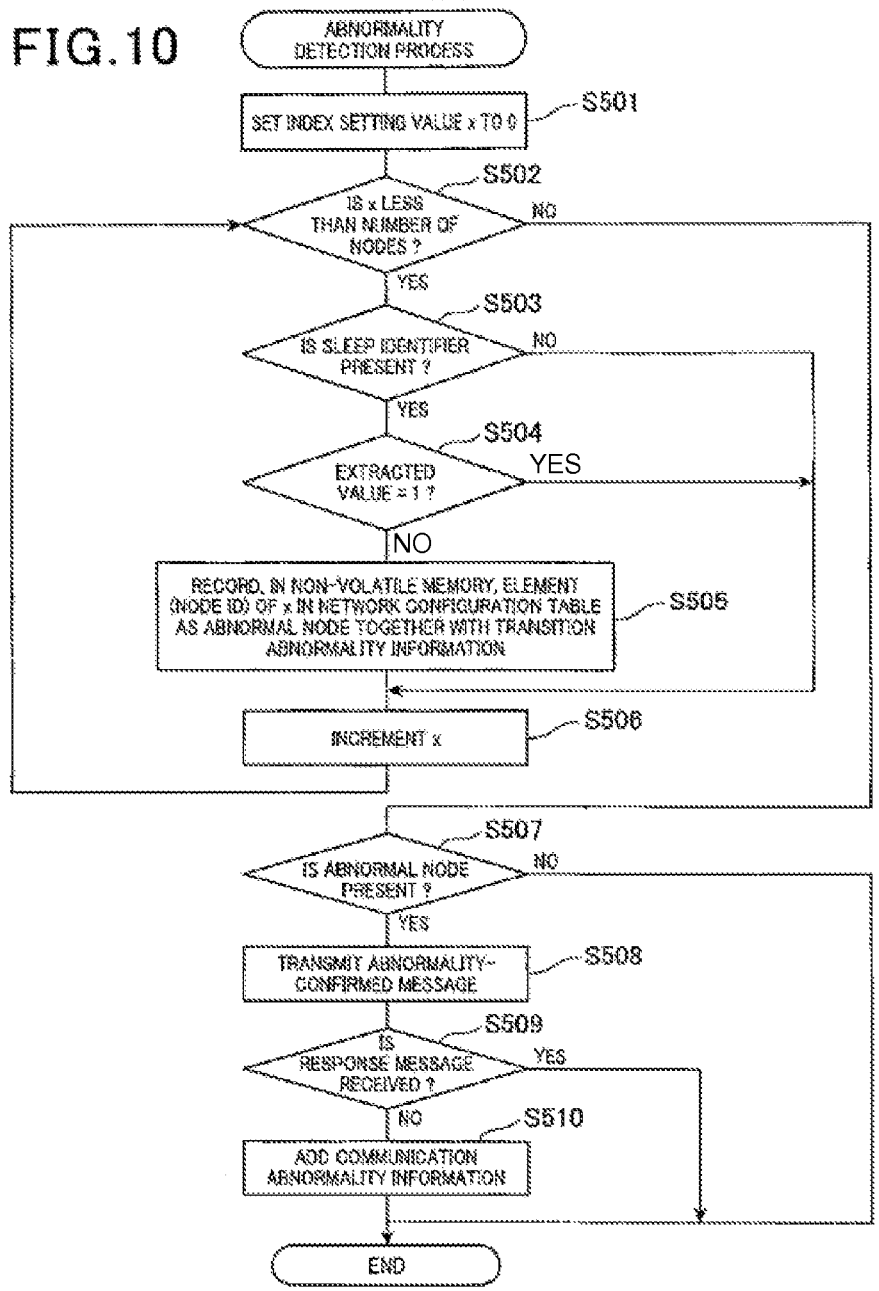
FIG. 10 shows a flowchart of a second embodiment of the processing operations in the abnormality detection process.

As shown in FIG. 10, when the abnormality detection process is started, first, the abnormality detecting section 22 sets an index value (x=0) indicating the head address in the buffer 32 (step S501). Next, the abnormality detecting section 22 judges whether or not the index setting value x is less than the total number of nodes (step S502). When judged "YES" at S502, the abnormality detecting section 22 proceeds to step S503. When judged "NO" at step S502, the abnormality detecting section 22 proceeds to step S507.

At step S503, the abnormality detecting section 22 judges whether or not a sleep identifier is included in the subject identifiers corresponding to the index setting value x from the buffer 32. The sleep identifier is a subject identifier indicating the group that is to transition to the power-saving state, in the sleep-entered message received by the network managing section 21. When judged "YES" at step S503, the abnormality detecting section 22 proceeds to step S504. When judged "NO" at step S503, the abnormality detecting section 22 proceeds to step S506.

At step S504, the abnormality detecting section 22 extracts the management information related to the sleep identifier in step S503 and judges whether or not the extracted management information is 1 indicating that the sleep-entered message has been received. Here, when judged "YES" at step S504, the abnormality detecting section 22 proceeds to step S506. When judged "NO" at step S504, the abnormality detecting section 22 proceeds to step S505. In other words, when judged that the management information related to the sleep identifier extracted from the buffer 32 is 0 (zero) indicating that the sleep-entered message has not been received, the abnormality detecting section 22 proceeds to step S505.

At step S505, the abnormality detecting section 22 records, in the non-volatile memory 14, the node ID corresponding with the index setting value x in the network configuration table 31 together with information (transition abnormality information) indicating that the node is a node (abnormal node) having an abnormality related to the state transition process in the group ID corresponding to the index setting value x in the same network configuration table 31. On the other hand, the abnormality detecting section 22 increments the index setting value x at step S506 and returns to step S502.

At step S507, the abnormality detecting section 22 judges whether or not an abnormal node has been detected in the processing operations at step S501 to S506. When judged "YES" at step S507, the abnormality detecting section 22 proceeds to step S508. When judged "NO" at step S507, the abnormality detecting section 22 ends the abnormality detection process.

At step S508, the abnormality detecting section 22 transmits an abnormality-confirmed message indicating that the node has been recorded as an abnormal node at step S505 to the relevant node. Next, the abnormality detecting section 22 judges whether or not some sort of response message in response to the abnormality-confirmed message transmitted at step S508 has been received from the node that is the transmission destination of the abnormality-confirmed message (step S509). When judged "YES" at step S509, the abnormality detecting section 22 ends the abnormality detection process.

On the other hand, the abnormality detecting section 22 adds, to the relevant node ID at step S505, information (communication abnormality information) indicating that the node has an abnormality related to the communication function regarding the node from which a response message has not been received at step S509 (step S510). The abnormality detecting section 22 then ends the abnormality detection process.

In other words, in the abnormality detection process according to the second embodiment, when the process is started after the elapse of the above-described sleep completion period, whether or not the sleep-entered message related to the sleep identifier has been received is confirmed using the node ID and the subject identifier (sleep identifier) included in the sleep-entered message. Nodes from which the message has been received in the group ID corresponding with the sleep identifier are normal nodes. Nodes from which the message has not been received are abnormal nodes and recorded as abnormal nodes. In other words, the abnormality detection process is performed for each group ID.

[Effects]

As described above, in the on-board network system 100 according to the second embodiment, the subject identifier is included in the NM message and the sleep-entered message. Therefore, when the sleep condition is met regarding all groups to which a node belongs, the node can transition from the normal state to the power-saving state. The monitoring ECU 100B can monitor the operating state of each node for each group.

In addition, in the on-board network system 100, the monitoring ECU 100B references the network configuration table 31 in which one or a plurality of group IDs are associated with each node ID. The monitoring ECU 100B performs the abnormality detection process for each group ID based on the node ID and the subject identifier included in the sleep-entered message. Therefore, the abnormal node can be efficiently detected.

In addition, in the on-board network system 100, the monitoring ECU 100B has the buffer 32 for temporarily storing therein management information indicating whether or not the sleep-entered message has been received for each subject identifier. When the microcomputer 11 is turned ON, the monitoring ECU 100B resets all pieces of management information in the buffer 32. During bus wakeup when at least one of the plurality of groups transitions from the power-saving state to the normal state, and during bus sleep cancelation when at least one of the plurality of groups terminates the state transition process, the monitoring ECU 100B resets the management information corresponding to the subject identifier of the group in the buffer 32.

As a result, not necessarily all pieces of management information in the buffer 32 are reset at once. Therefore, the monitoring ECU 100B can collectively perform the abnormality detection process in a state in which, for example, a certain number of pieces of management information are stored in the buffer 32. The reception of the sleep-entered message can be efficiently checked.

Third Embodiment

Next, an on-board network system according to a third embodiment of the present invention will be described with reference to the drawings. According to the third embodiment, the differences with the second embodiment will mainly be described. Unless specifically described, description of each constituent element will be omitted through use of the same reference numbers as those according to the second embodiment.

[Configuration of the Monitoring ECU]

First, the differences with the second embodiment in the configuration of the monitoring ECU 100B according to the third embodiment will be described.

Figure 11:
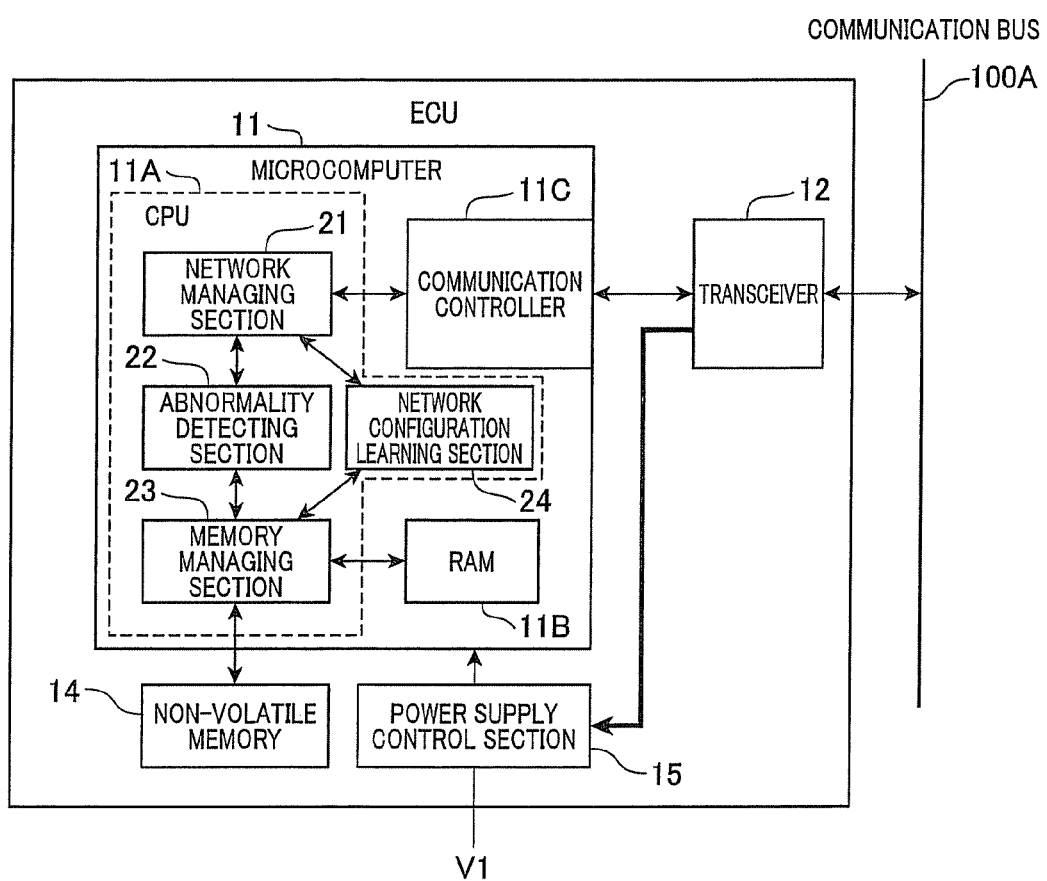
FIG. 11 shows a second embodiment of a master.

As shown in FIG. 11, the CPU 11A of the monitoring ECU 100B includes, when functionally divided, a network configuration learning section 24, in addition to the network managing section 21, the abnormality detecting section 22, and the memory managing section 23. The network managing section 21 transmits and receives the control messages to and from the communication controller 11C. The abnormality detecting section 22 detects an abnormal operation in the nodes. The memory managing section 23 manages the RAM 11B and the non-volatile memory 14. The network configuration learning section 24 learns the configuration of the on-board network system 100.

[Network Configuration Learning Process]

Figure 12:
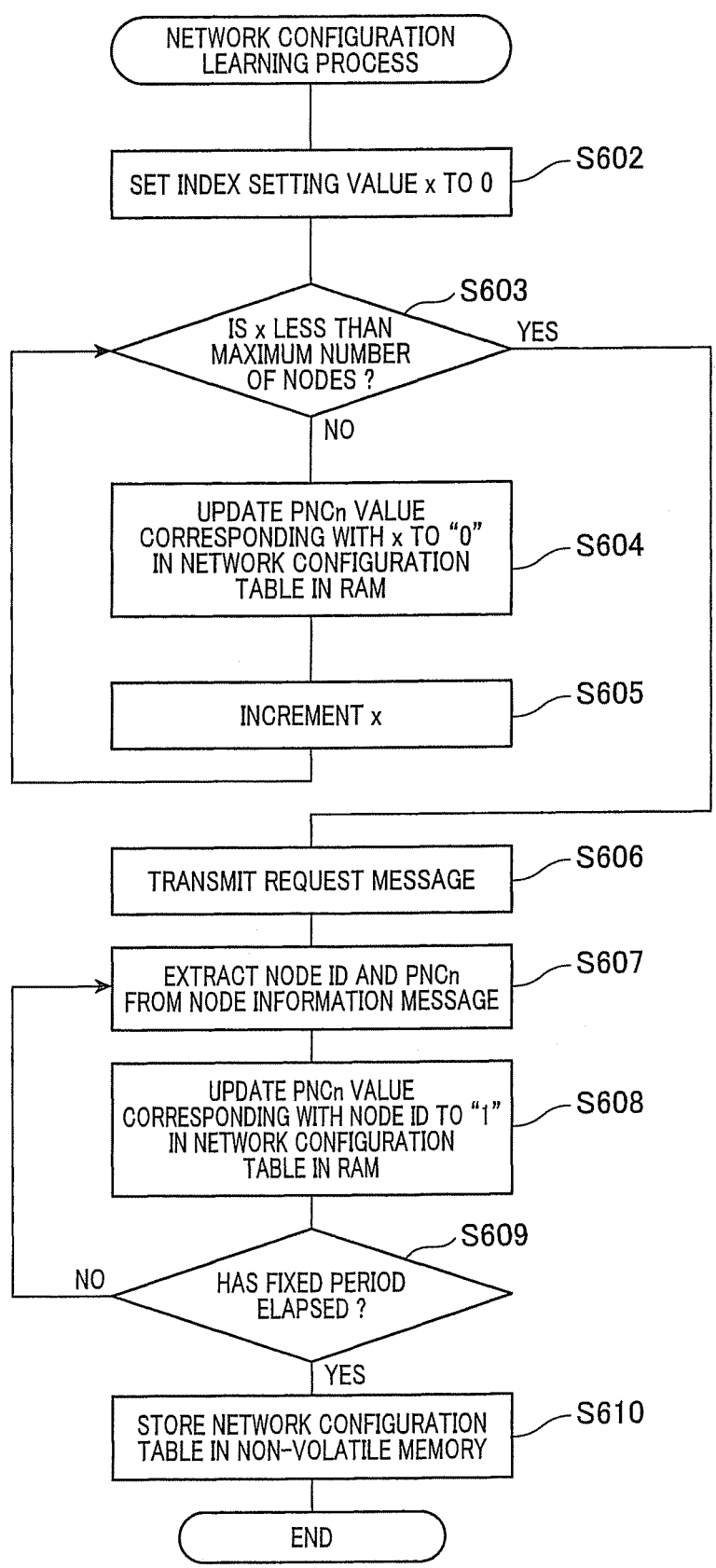
FIG. 12 shows a flowchart of an example of processing operations in a network configuration learning process.

Here, a network configuration learning process performed by the CPU 11A of the monitoring ECU 100B as a function of the network configuration learning section 24 will be described with reference to the flowchart in FIG. 12. The network configuration learning process is started at a predetermined timing before, for example, each node is assembled to the vehicle at a factory and the vehicle is shipped.

When the network configuration learning process is started, first, the network configuration learning section 24 sets the index value (x=0) indicating the head address in the network configuration table 31 stored in the RAM 11B (step S602). Next, the network configuration learning section 24 judges whether or not the index setting value x is less than the maximum number of nodes that can be connected to the communication bus 100A (step S603). When judged "YES" at step S603, the network configuration learning section 24 proceeds to step S604. When judged "NO" at step S603, the network configuration learning section 24 proceeds to step S606.

At step S604, the network configuration learning section 24 resets all elements corresponding with the index setting value x in the network configuration table 31 stored in the RAM 11B and proceeds to step S605. At step S605, the network configuration learning section 24 increments the index setting value x and returns to step S603.

In this way, in the processing operations at step S602 to S605, the network configuration learning section 24 resets the network configuration table 31 itself by resetting the elements related to all indexes in the network configuration table 31 stored in the RAM 11B.

At subsequent step S606, the network configuration learning section 24 transmits, to the communication bus 100A, a request message that is set in advance for learning the configuration of the on-board network system 100. The network configuration learning section 24 then proceeds to step S607. Each node that has received the request message transmits a node information message to the communication bus 100A. The node information message indicates the node ID for identifying the node itself and the group ID for identifying the group to which the node itself belongs.

In response, at step S607, the network configuration learning section 24 extracts the node ID and the group ID (PNCn) from the received node information message each time the node information message has been received over the communication bus 100A. At subsequent step S608, the network configuration learning section 24 writes the node ID in the network configuration table 31 stored in the RAM 11B based on the extracted results at S607, and updates the PNCn value corresponding to the node ID to 1.

Then, at step S609, the network configuration learning section 24 judges whether or not a fixed period set in advance for receiving the node information message from each node has elapsed. When judged "YES" at step S609, the network configuration learning section 24 proceeds to step S610. When judged "NO" at step S609, the network configuration learning section 24 returns to step S607. Finally, at step S610, the network configuration learning section 24 stores (updates), in the non-volatile memory 14, the network configuration table 31 in which the PNCn value for all node IDs has been updated. In addition, the network configuration learning section 24 deletes the network configuration table 31 from the RAM 11B and ends the network configuration learning process.

[Effects]

As described above, in the on-board network system 100 according to the third embodiment, the network configuration table 31 is automatically set by the network configuration learning process. Therefore, for example, even when the group to which a node belongs changes, the change can be flexibly handled. In addition, for example, when the number of nodes increases, the amount of increase is merely required to be rewritten in a program within the monitoring ECU 1008. The network configuration table 31 is not required to be rewritten. Therefore, planning changes in the network can be made relatively easier.

Other Embodiments

The embodiments of the present invention are described above. However, the present invention is not limited to the above-described embodiments. Various embodiments are possible without departing from the scope of the present invention.

For example, in the above-described abnormality detection process according to the first and second embodiments, when an abnormal node is detected, an abnormality-confirmed message is transmitted. However, in addition to or instead of this processing operation, a command message may be transmitted to the communication bus 100A to cancel the bus-sleep of one or a plurality of nodes within the group to which the abnormal node belongs.

In addition, according to the above-described second embodiment, the node transmits the sleep-entered message to the communication bus 100A each time the sleep condition is met for each group to which the node belongs. However, the node may transmit the sleep-entered message to the communication bus 100A when the sleep condition is met for all groups to which the node belongs.

In addition, in the above-described abnormality detection process according to the second embodiment, the abnormal node is detected based on the sleep identifier. However, the present invention is not limited thereto. The monitoring ECU 100B may obtain the bus-sleep state for each group based on the NM messages and detect the abnormal node for each group based on at least the subject identifier included in the sleep-entered message.

According to the above-described first to third embodiments, the state transition process of each node in the keyless entry system PNC1 and the security system PNC2 is described. However, this description is merely a specific example for describing the present invention. The present invention is not necessarily limited to this specific example.

What is claimed is:

1. An on-board network system, comprising: a plurality of electronic control units that are communicably connected with each other over a communication bus, mounted in a vehicle, wherein the plurality of electronic control units comprise nodes that perform a state transition process for transitioning from a normal state to a power-saving state, according to a sleep condition set in advance, and a master that performs an abnormality detection process for detecting an abnormality related to the state transition process for each node;

each node periodically transmits a network management (NM) message indicating that the node itself is unable to transition to the power-saving mode to the communication bus;

the sleep condition is met, when the node is able to transition to the power-saving mode, the node itself ceases transmitting the NM message, and also when NM-ceased period during which NM messages are not received from other electronic control units over the communication bus exceeds a wait period set in advance;

in the state transition process performed by each node, when the sleep condition is met, the node transmits a sleep-entered message indicating that the sleep condition is met to the communication bus; and in the abnormality detection process performed by the master, abnormality related to the state transition process performed by each node is detected based on whether or not the sleep-entered message has been received.

2. The on-board network system according to claim 1, wherein
the sleep-entered message includes a node ID that is capable of identifying a node from where the message is sent; and
the master manages the node IDs, wherein in the abnormality detection process, using the node ID in the sleep-entered message, the master deals with a node that sends the sleep-entered message as a normal node, and deals with a node that does not send the sleep-entered message as an abnormal node, and thereby records the ID of the abnormal node in a non-volatile memory.

3. The on-board network system according to claim 2, wherein
the master comprises a buffer memory for temporary storing management information indicating whether or not the master received the sleep-entered message and initializes the buffer memory at the time when the master's power is switched ON, at a bus-wakeup timing in which any one of nodes' state transitions from the power-saving state to the normal state, and at a bus-sleep cancellation timing in which any one of nodes ceases the state transition process.

4. The on-board network system according to claim 3, wherein
the NM-ceased period is a period during which none of electronic control units receives the NM message each other from other electronic control units over the communication bus.

5. The on-board network system according to claim 3, wherein
each node belongs at least one group within a plurality of groups that are divided in advance in the communication bus;
the NM message includes a node ID that is capable of identifying a node from where the message is sent, and a subject identifier for identifying a group that the NM message is to be sent to, within one or more group IDs for identifying a group that the node belongs to;
the NM-ceased period is a period during which none of electronic control units receives a NM message including the subject identifier from all of other nodes in a group corresponding to the subject identifier;
the sleep-entered message includes the subject identifier which corresponds to a group that satisfies the sleep condition; and
in the state transition process, the normal state transfers to the power-saving mode in a case where all groups that a specific node belongs to satisfy the sleep condition.

6. The on-board network system according to claim 5, wherein
the master refers to a network table in which each node ID corresponds to one or more group ID, thereby performs the abnormality detection process for each group ID based on both the node ID and the subject identifier that are included in the sleep-entered message.

7. The on-board network system according to claim 6, wherein
the node sends a node information message to the communication bus when the node receives a request message set in advance, the node information message indicating both a node ID corresponding to the node and a group ID corresponding to a group that the node belongs to; and
the master sends the request message to the communication bus, and sets the network table based on the node information message received from the node.

8. The on-board network system according to claim 7, wherein the master comprises
a buffer memory for temporary storing a management information indicating whether or not the master received the sleep-entered message for each subject identifier; and
an initializing section for initializing all management information in the buffer memory at the time when a master's power is switched ON, and for initializing a management information temporarily stored in the buffer memory, the management information corresponding to the subject identifier of said group, at a bus-wakeup timing in which at least any one of groups' state transitions from the power-saving state to the normal state and at a bus-sleep cancellation timing in which at least any one of groups ceases the state transition process.

9. The on-board network system according to claim 8, wherein
the sleep-entered massage includes a node ID for identifying a node from which the message sent;
the master manages node IDs, wherein in the abnormality detection process, using the node ID in the sleep-entered message, the master deals with a node that sends the sleep-entered message as a normal node, and deals with a node that does not send the sleep-entered message as an abnormal node, thereby records the abnormal node in a non-volatile memory, and sends an abnormality-confirmed message to the abnormal node, thereby updates or deletes the record of the abnormal node depending on whether or not receives an answer message against the abnormality-confirmed message.

10. The on-board network system according to claim 1, wherein
the master comprises a buffer memory for temporary storing a management information indicating whether or not the master received the sleep-entered message and initializes the buffer memory at the time when the master's power is switched ON, at a bus-wakeup timing in which any one of nodes' state transitions from the power-saving state to the normal state, and at a bus-sleep cancellation timing in which any one of nodes ceases the state transition process.

11. The on-board network system according to claim 1, wherein
the NM-ceased period is a period during which none of electronic control units receives the NM message each other from other electronic control units over the communication bus.

12. The on-board network system according to claim 1, wherein
each node belongs at least one group within a plurality of groups that are divided in advance in the communication bus;
the NM message includes a node ID that is capable of identifying a node from where the message is sent, and a subject identifier for identifying a group that the NM message is to be sent to, within one or more group IDs for identifying a group that the node belongs to;
the NM-ceased period is a period during which none of electronic control units receives a NM message including the subject identifier from all of other nodes in a group corresponding to the subject identifier;

the sleep-entered message includes the subject identifier which corresponds to a group that satisfies the sleep condition; and in the state transition process, the normal state transfers to the power-saving mode in a case where all groups that a specific node belongs to satisfy the sleep condition.

13. The on-board network system according to claim 1, wherein the sleep-entered massage includes a node ID for identifying a node from which the message sent;

the master manages node IDs, wherein in the abnormality detection process, using the node ID in the sleep-entered message, the master deals with a node that sends the sleep-entered message as a normal node, and deals with a node that does not send the sleep-entered message as an abnormal node, thereby records the abnormal node in a non-volatile memory, and sends an abnormality-confirmed message to the abnormal node, thereby updates or deletes the record of the abnormal node depending on whether or not receives an answer message against the abnormality-confirmed message.

14. The on-board network system according to claim 2, wherein the NM-ceased period is a period during which none of electronic control units receives the NM message each other from other electronic control units over the communication bus.

15. The on-board network system according to claim 2, wherein each node belongs at least one group within a plurality of groups that are divided in advance in the communication bus;

the NM message includes a node ID that is capable of identifying a node from where the message is sent, and a subject identifier for identifying a group that the NM message is to be sent to, within one or more group IDs for identifying a group that the node belongs to;

the NM-ceased period is a period during which none of electronic control units receives a NM message including the subject identifier from all of other nodes in a group corresponding to the subject identifier;

the sleep-entered message includes the subject identifier which corresponds to a group that satisfies the sleep condition; and in the state transition process, the normal state transfers to the power-saving mode in a case where all groups that a specific node belongs to satisfy the sleep condition.

16. The on-board network system according to claim 5, wherein the master comprises a buffer memory for temporary storing a management information indicating whether or not the master received the sleep-entered message for each subject identifier; and an initializing section for initializing all management information in the buffer memory at the time when a master's power is switched ON, and initializing a management information temporarily stored in the buffer memory, the management information corresponding to the subject identifier of said group, at a bus-wakeup timing in which at least any one of groups' state transitions from the power-saving state to the normal state and at a bus-sleep cancellation timing in which at least any one of groups ceases the state transition process.

17. The on-board network system according to claim 6, wherein the master comprises a buffer memory for temporary storing a management information indicating whether or not the master received the sleep-entered message for each subject identifier; and an initializing section for initializing all management information in the buffer memory at the time when a master's power is switched ON, and for initializing a management information temporarily stored in the buffer memory, the management information corresponding to the subject identifier of said group, at a bus-wakeup timing in which at least any one of groups' state transitions from the power-saving state to the normal state and at a bus-sleep cancellation timing in which at least any one of groups ceases the state transition process.

18. The on-board network system according to claim 2, wherein the sleep-entered massage includes a node ID for identifying a node from which the message has been sent; and the master manages node IDs, wherein in the abnormality detection process, using the node ID in the sleep-entered message, the master deals with a node that sends the sleep-entered message as a normal node, and deals with a node that does not send the sleep-entered message as an abnormal node, thereby records the abnormal node in a non-volatile memory, and sends an abnormality-confirmed message to the abnormal node, thereby updates or deletes the record of the abnormal node depending on whether or not receives an answer message against the abnormality-confirmed message.

19. The on-board network system according to claim 3, wherein the sleep-entered massage includes a node ID for identifying a node from which the message has been sent; and the master manages node IDs, wherein in the abnormality detection process, using the node ID in the sleep-entered message, the master deals with a node that sends the sleep-entered message as a normal node, and deals with a node that does not send the sleep-entered message as an abnormal node, thereby records the abnormal node in a non-volatile memory, and sends an abnormality-confirmed message to the abnormal node, thereby updates or deletes the record of the abnormal node depending on whether or not receives an answer message against the abnormality-confirmed message.

20. The on-board network system according to claim 4, wherein the sleep-entered massage includes a node ID for identifying a node from which the message has been sent; and the master manages node IDs, wherein in the abnormality detection process, using the node ID in the sleep-entered message, the master deals with a node that sends the sleep-entered message as a normal node, and deals with a node that does not send the sleep-entered message as an abnormal node, thereby records the abnormal node in a non-volatile memory, and sends an abnormality-confirmed message to the abnormal node, thereby updates or deletes the record of the abnormal node depending on whether or not receives an answer message against the abnormality-confirmed message.

21. An on-board network system, comprising: a plurality of electronic control units that are communicably connected with each other over a communication bus, wherein the plurality of electronic control units comprise nodes and a master;

any nodes comprise a section for transmitting a network management (NM) message indicating a fact that the node cannot transfer from a normal state to a power-saving state to the communication bus when a term while the node did not receive the NM message from any one of other electric units does not exceed a wait period set in advance, stopping transmitting the NM message and transmitting a sleep-entered message to the communication bus when the term while the node did not receive the NM message from any one of other electric units exceeds the wait period; and the master comprise a section for detecting abnormality related to said state transition process from normal state to the power-saving state performed by each node based on whether or not the sleep-entered message has been received.

* * * * *